United States Patent [19]

Abdullaev et al.

[11] Patent Number: 5,027,897

[45] Date of Patent: Jul. 2, 1991

[54] METHOD OF TREATMENT OF DRILLED-IN UNDERGROUND FORMATION SATURATED WITH HYDROCARBON GAS

[76] Inventors: Teimur I. Abdullaev, ulitsa Sotsialisticheskaya, 70; Vagif J. Bakhishev, poselok Serebrovskogo, ulitsa Vinogradnaya, 13, kv.1., both of Baku; Lev B. Berman; Svetlana S. Berman, both of Malaya Bronnaya ulitsa, 36, kv.5., both of Moscow; Gasan G. Gumbatov, ulitsa Sovetskaya, 57/24, kv.61., Baku; Oskar E. Karash, 5 mikroraion, ulitsa Pishavari, 17, kv.66., Baku; Sabir M. Kasumov, Leningradsky prospekt, 81, kv.57., Baku; Leonid G. Kulpin, ulitsa Katukova, 16, korpus 1, kv.14., Moscow; Azat K. Mirzadzhanzade, Chernomorsky bulvar, 4, kv.218., Moscow; Alexei V. Sokolov, prospekt Mira, 112, kv.255., Moscow; Otto V. Chubanov, Sevastopolsky bulvar, 83, korpus 2, kv.56., Moscow; Boris S. Eidlin, ulitsa Marshala Vasilevskogo, 7, korpus 2, kv.149., Moscow, all of U.S.S.R.

[21] Appl. No.: 481,290

[22] Filed: Feb. 20, 1990

[51] Int. Cl.$^5$ .................... E21B 47/06; E21B 43/22
[52] U.S. Cl. ............................ 166/252; 166/304
[58] Field of Search ............ 166/281, 284, 285, 304, 166/252

[56] References Cited

U.S. PATENT DOCUMENTS

| | | | |
|---|---|---|---|
| 3,160,206 | 12/1984 | Jorda | 166/304 X |
| 3,915,233 | 10/1975 | Slusser . | |
| 4,044,833 | 8/1977 | Volz . | |
| 4,648,453 | 3/1987 | Nagra et al. | 166/285 |
| 4,721,158 | 11/1988 | Merritt, Jr. et al. | 166/252 X |
| 4,733,724 | 3/1988 | Cardenas et al. | 166/252 |

*Primary Examiner*—George A. Suchfield
*Attorney, Agent, or Firm*—Lilling and Lilling

[57] ABSTRACT

The method consists in that the formation pressure is measured, and a solvent is fed through a well into the formation. Then a hydrophilizing solution is fed through the same well into the same formation. The supply of the solvent and hydrophilizing solution is effected while keeping the bottom hole pressure approximately equal to the formation pressure.

8 Claims, No Drawings

METHOD OF TREATMENT OF DRILLED-IN UNDERGROUND FORMATION SATURATED WITH HYDROCARBON GAS

BACKGROUND OF THE INVENTION

The present invention may be used for restoring the permeability of the formation about the well having reduced permeability due to hydrophobization of the formation caused by deposition of heavy hydrocarbon fractions in the formation accompanied by accumulation of gas condensate therein in a liquid phase.

DESCRIPTION OF THE RELATED ART

At the present time, during the development of fields of oil and/or gas and/or condensate pools, the productive capacity of wells, as a rule, drops down in the process of their operation due to a drop of the formation pressure and poor permeability of the formation near the well. The formation permeability is also deteriorated due to penetration of the drilling mud filtrate into this formation in the process of construction and completion of the well. The deterioration of the formation permeability also results from hydrophobization of the formation due to accumulation of gas condensate in the form of a steady-state medium under pressure and accumulation of heavy fractions of hydrocarbons in this zone. The heavy hydrocarbon fractions comprising asphaltenes, resins, paraffins and other hydrocarbons are in the formation fluids either in a liquid or in a solid state. If the heavy hydrocarbon fractions are solids, they usually adhere to the formation surface. The gas condensate as a steady-state fluid under pressure formed due to a drop of the temperature and pressure in this zone of the formation in the process of well operation is accumulated in this zone. The above processes result in reduction of the formation permeability, first of all, in the formation zone about the well so that the productive capacity of the well drops down.

Various methods are presently used for increasing the productive capacity of wells by increasing the permeability of the zones of formation about these wells. Well known in the art is the method of breaking the formation by various fluids and solutions of acids including various chemical reagents (U.S. Pat. No. 4,044,833). This method is effected by feeding the above fluid through the well into the formation zone about the well under pressure overcoming the breakdown pressure. The breakdown pressure is that sufficient for forming cracks in the formation, which are kept open in the process of operation of the well. The cracks increase the permeability of the formation zone about the well. However, during subsequent operation of the well further heavy hydrocarbon fractions are again accumulated in the cracks and gas condensate under steady-state pressure settles on these fractions. To remove the accumulated gas condensate, the pressure drop between the formation and the well must be increased, which can result in undesirable changes of the formation structure. Furthermore, the cracks in the formation zone about the well are distributed unevenly and this reduces the efficiency of the subsequent operation of the well. The uneven distribution of cracks in the formation is associated with anisotropic physical and mechanical properties of the formation.

Known in the art is a method of treatment of a formation exposed by a well and saturated with a hydrocarbon gas (U.S. Pat. No. 3,915,233), in which a solvent for displacing the reservoir fluid from the formation zone about the well and for solving the heavy hydrocarbon fractions deposited in this formation zone, and then a hydrophilizing solution, is fed through the same well into the formation to reduce the surface tension and displace the previously pumped solvent. Then a fluid, which is not mixed with the hydrophilizing solution, is fed in an amount sufficient for forming filtration channels. This fluid comprises oil or another liquid hydrocarbon. The solvent, hydrophilizing solution and fluid are fed under pressure to maintain a considerable pressure difference between the bottom-hole and reservoir values. However, the bottom-hole pressure does not overcome the formation-breaking pressure.

This method makes it possible to clean the filtration channels of the formation zone about the well from previously deposited heavy hydrocarbon fractions of gas condensate. The hydrophilizing solution makes it possible to reduce the surface tension between the surface of the filtration channels and water. When the fluid, which is immiscible with the hydrophilizing solution, is forced into the well, this solution is displaced from some filtration channels, and during further operation of the well the formation fluid is fed into the well through said freed filtration channels. When forcing the solvent, hydrophilizing solution and fluid under pressure below the formation breakdown pressure, the initial structure of the formation and, therefore, the previously existed filtration channels in this formation are preserved. In addition, this method makes it possible to increase the residence time of the filtration channel free from heavy hydrocarbon fractions and gas condensate, which are removed together with the formation fluid compared to the time of existence of such filtration channels formed during the formation breakdown. However, the prior art method does not allow one to provide uniform treatment of the formation zone about the well, and this essentially restricts the recovery of permeability of the whole formation zone. The nonuniform treatment of the formation zone about the well results from the anisotropic properties of the formation characterized by the permeability of individual filtration channels. Furthermore, the supply of the solvent, hydrophilizing solution and fluid is effected under pressure and this, in turn, increases the anisotropic properties of the formation in the above zone because, first of all, highly permeable filtration channels are developed, and this also results in nonuniform treatment of the formation zone about the well. What is more, the dissolving and removal of the heavy hydrocarbon fractions are incomplete. This is due to the fact that the dissolving capacity of any solvent depends on its velocity, when it moves in the formation: the higher this velocity, the lower the dissolving capacity of the solvent. When the solvent is fed under said pressure, the solvent velocity in the formation is high and this reduces the dissolving efficiency and hinders removal of the heavy hydrocarbon fractions from the formation.

An object of the proposed invention is to provide a method of treatment of a drilled-in underground formation saturated with gaseous hydrocarbons, which would allow one to increase the productive capacity of the well by improving the permeability of the formation passed by this well.

These and other objects are attained by providing a method of treatment of a drilled-in underground formation saturated with gaseous hydrocarbons, in which the formation pressure is determined, then a solvent is fed through the well into the formation for displacing the formation fluid from the formation zone about the well and for dissolving the heavy hydrocarbon fractions deposited in said formation zone; thereafter a hydrophilizing solution is fed into the same formation through the same well to reduce the surface tension between the formation surface and the water and to displace the solvent under pressure; the solvent and the hydrophilizing solution are fed into the formation while maintaining the bottom-hole pressure approximately equal to the formation pressure.

This object is attained by providing a method of treatment of a drilled-in underground formation saturated with hydrocarbon gas, in which the formation pressure is determined, then a solvent is fed through the well into the formation for displacing the formation fluid from the formation zone about the well and for dissolving the heavy hydrocarbon fractions deposited in said formation zone; after that a hydrophilizing solution is fed into the same formation through the same well to reduce the surface tension between the formation surface and the water and to displace the preforced solvent; the solvent and the hydrophilizing solution are fed into the formation while maintaining the bottom-hole pressure approximately equal to the formation pressure.

The formation pressure is determined as follows. A downhole pressure gauge is put into the well up to the bottom. The formation pressure is measured using this downhole pressure gauge. A proportioning pump is installed near the well head to supply the solvent and hydrophilizing solution into the well. A pipe string is put into the well and is connected to the proportioning pump. Before pumping the solvent, the annular space of the well is closed and the solvent is forced into the tubing space while maintaining the bottom-hole pressure close to the formation pressure. The solvent, penetrating into the formation zone about the well, displaces the formation fluid from this zone and dissolves the heavy hydrocarbon fractions deposited in the formation of said zone. After that, the same proportioning pump is used for feeding the hydrophilizing solution while keeping the bottom-hole pressure approximately equal to the formation pressure. The hydrophilizing solution displaces the previously fed solvent and is adsorbed on the formation surface thus reducing the surface tension between the formation surface and the water. After that, the well is put into operation.

When the solvent is fed under the claimed conditions, its velocity of propagation in the formation is minimum. Under such conditions of feeding the solvent the anisotropic properties of the formation effect but slightly the conditions of propagation of the solvent through said formation zone thus providing the most uniform distribution of the solvent in this zone. Furthermore, under these conditions of supply of the solvent the heavy hydrocarbon fractions deposited on the formation are completely dissolved and removed with this solvent. When the hydrophilizing solution is fed under the claimed conditions, it provides effective displacement of the previously supplied solvent thus ensuring complete contact of the hydrophilizing solution with the formation surface.

The volumes of solvent and hydrophilizing solution to be pumped are determined in a usual way by taking into account the size of the formation zone about the well. The radius of this zone is determined, for example, by the pressure recovery curves. The calculations are based on an assumption that the above zone must be provided with a volume of solvent equal to or higher than a value V determined by the formula $$V = \sum_{i=1}^{n} h_i \cdot S \cdot m_i(1 - K_{gi}),$$

where
$h_i$ is the thickness of the ith formation in meters;
S is the area of the formation zone adjacent to the well, in m$^2$;
$m_i$ is the porosity of the ith formation;
$K_{gi}$ is the critical gas saturation of the ith formation;
n is the number of drilled-in formations;
$m_i$ and $K_{gi}$ are determined by any method known in the art.

When data for evaluation of $K_{gi}$ are not available, the following ratio is used:

$$K_{gi} = 0.8 K'_{gi}$$

where $K'_{gi}$ is the initial gas saturation of the formation.

If the value S is not determined or the treatment is performed prior to putting the well into operation, the volume of this zone is determined so as to provide hydrophilization of the zone with a radius of minimum 1 m, since this portion of the formation is characterized by the maximum concentration of gas condensate, which defines the decrease of the productive efficiency of the well.

The formation zone about the well is preferably supplied with a solvent selected from the following group: alcohols comprising from one to seven atoms of carbon, ketones, dioxanes, kerosene, stable gas condensate, diesel oil.

The alcohols comprising from one to seven atoms of carbon are monatomic alcohols: methanol, ethanol; diatomic alcohols: ethylene glycol, propylene glycol, tetraethylene glycol.

The ketones comprise acetone, methylethylene glycol, methylvinyl ketone.

These substances dissolve most of heavy hydrocarbon fractions present in the formation fluid and adsorbed in the formation.

It is expedient that the formation zone about the well is supplied with a hydrophilizing solution selected from the group: weak water solutions of acids with a concentration less than 1%, weak water solutions of salts of alkali metals with a concentration maximum 1%, as well as solutions of surfactants.

The weak water solutions of acids comprise hydrochloric acid, hydrofluoric acid, nitric acid. The weak water solutions of salts of alkali metals comprise sodium chloride, lithium nitride, potassium dioxide.

The surfactants include sulphonol solutions (i.e. alkyl benzene sulphonates), hydroxyethylated fatty acids, xylene sulphaminobenzene.

It is preferable to select a solvent dissolving in the hydrophilizing solution from the above-mentioned group of solvents.

Such solvents may include alcohols comprising from one to seven carbon atoms, ketones, dioxanes. This makes it possible to carry out the process of displacement of the formation fluid under conditions of mixed displacement, i.e. to clean the formation surface from the adsorbed heavy hydrocarbon fractions.

It is also expedient that the solvent fed into the formation have a velocity equal to that of the hydrophilizing solution forced into the same formation.

This is necessary for eliminating a possibility of penetration of the hydrophilizing solution into the formation, which had not been treated with a solvent.

It is advisable that the hydrophilizing solution is provided with an agent increasing the viscosity of this solution. Polyacrylamide may be used as such an agent. This allows one to increase the viscosity of the hydrophilizing solution thus reducing the velocity of its propagation through the formation and, as a result, to eliminate a possibility of penetration of the hydrophilizing solution into areas of the formation, which had not been treated with a solvent. Thus, the method of treatment of a drilled-in underground formation saturated with hydrocarbons effected according to the present invention, due to a change of the conditions of supply of the solvent and hydrophilizing solution, makes it possible:

- to completely remove the heavy hydrocarbon fractions adsorbed in the formation zone about the well;
- to provide uniform propagation of the hydrophilizing solution in said zone of said formation and this, as a result, makes it possible;
- to increase the formation permeability reduced in the process of previous operation of the well;
- to provide low permeability of the formation long after its treatment.

DESCRIPTION OF THE PREFERRED EMBODIMENTS

The invention is illustrated by detailed examples of putting it into effect.

The method of treatment of a drilled-in underground formation saturated with hydrocarbons consists in that the formation pressure is preliminarily measured. Then, a solvent is fed through the well into said formation to displace the formation fluid from the formation zone about the well and to dissolve the heavy hydrocarbon fractions deposited in the formation of said zone. After that, fed through the same formation into the same well is a hydrophilizing solution reducing the surface tension between the formation surface and the water. The solvent and hydrophilizing solution are fed into said formation while keeping the bottom-hole pressure equal to the previously measured formation pressure. The formation pressure is measured by means of a pressure gauge lowered to the well bottom, while the bottom-hole pressure is being kept approximately equal to the pressure of the hydrophilizing solution fed into the well by means of a proportioning pump operating in the dropwise mode. The solvent and hydrophilizing solution are supplied through the pipe string or through the space between the pipe string and the casing string.

During the displacement of the formation fluid the solvent is effectively distributed in the formation of said zone regardless of the porosity of said formation, since the solvent velocity with approximate equality of said bottom-hole pressure and the premeasured formation pressure is characterized by the physical and chemical properties of the solvent, heavy hydrocarbon fractions and formation surface. Under these conditions of feeding the solvent the formation fluid is completely displaced from the formation of said zone.

The hydrophilizing solution, whose velocity is also characterized by physical and chemical properties of the formation surface, solvent and hydrophilizing solution, completely displaces the previously supplied solvent and is adsorbed practically over the whole surface of the formation zone about the well while reducing the surface tension between this surface and the water.

The well is put into operation after the formation fluid has been transferred from the formation to the well, e.g. by applying pressure on the formation.

The formation zone about the well is fed with a solvent selected from the group of alcohols comprising from one to seven atoms of carbon, ketones, dioxanes, kerosene, stable gas condensate and diesel oil.

As a rule, these solvents completely dissolve the depositions of heavy hydrocarbon fractions adsorbed on the formation surface.

The solvent comprises monatomic alcohols: methanol, ethanol, propanol; biatomic alcohols: ethylene glycol, propylene glycol, tetraethylene glycol and the like.

The ketones comprise acetone, methylethylene glycol, methylvinyl ketone.

The formation zone about the well is supplied with hydrophilizing solution having a concentration of less than 1% and selected from the group: weak aqueous solutions of acids, weak aqueous solutions of salts of alkali metals.

The weak aqueous solutions of acids comprise hydrogen chloride, hydrofluoric acid or nitric acid.

The weak aqueous solutions of salts of alkali metals comprise sodium chloride, lithium chloride, potassium methaxylate.

The surfactants comprise aqueous solutions of sulphonols (e.g. sodium alkylbenzene sulphonates) as well as oil sulphonates and others.

Furthermore, the solvent selected from the above group of solvents should dissolve in the hydrophilizing solution, i.e. the solvent forming a single-phase fluid mixing with the hydrophilizing solution in the formation zone about the well. These solvents include alcohols, ketones and dioxanes.

The velocity of propagation of the hydrophilizing solution through the formation zone about the well is limited by the above value, which does not exceed the velocity of the solvent in the same zone when both fluids are supplied simultaneously while maintaining the downhole pressure equal to the formation pressure. To this end, an agent increasing the viscosity of the hydrophilizing solution is added to this solution. Such an agent comprises polyacrylamide and similar substances such as polyacryl nitrile, polymethyl acrylate. The increased viscosity of the hydrophilizing solution prevents a possibility of its breakdown through previously fed solvent and interaction with the formation surface untreated with the solvent.

The following examples illustrate the present invention and describe the preferred embodiments thereof.

EXAMPLE 1

The method is illustrated by a new offshore well on the Caspian Sea having a high content of gas condensate. The formation of this deposit is formed by a sandstone layer 10 m thick. The chromatographic analysis of hydrocarbons of this deposit is given in Table 1.

TABLE 1

The results of chromatographic analysis of condensate prior to treatment by the claimed method

| Hydrocarbon | Content, wt. % | Hydrocarbon | Content, wt. % |
|---|---|---|---|
| H—$C_{10}$ | 36.5 | M-$C_{15}$ | 2.2 |

TABLE 1-continued

The results of chromatographic analysis of condensate prior to treatment by the claimed method

| Hydrocarbon | Content, wt. % | Hydrocarbon | Content, wt. % |
|---|---|---|---|
| H—$C_{11}$ | 21.8 | H—$C_{15}$ | 1.9 |
| H—$C_{12}$ | 14.5 | M-$C_{16}$ | 0.6 |
| M-$C_{13}$ | 7.2 | H—$C_{16}$ | 1.2 |
| H—$C_{13}$ | 5.1 | M-$C_{17}$ | — |
| M-$C_{14}$ | 4.1 | H—$C_{17}$ | 0.7 |
| H—$C_{14}$ | 3.0 | i-$C_{19}$ | 1.2 | where
H are normal alkanes;
M are monomethyl saturated alkanes;
i are isoprenoids.

The study of the results of chromatographic analysis of the formation condensate has shown that methanol may be used as a solvent. The hydrophilizing solution for sandstone treatment included 0.5% of hydrochloric acid with addition of 0.2% of polyacrylamide. The radius of the zone of deposition of heavy hydrocarbon fractions was equal to 1 m, and this needs pumping of 1 m³ of solvent and 1 m³ of hydrophilizing solution per meter of formation thickness.

Before the treatment of the well, at its head there were installed tanks for the solvent and hydrophylizing solution communicating through proportioning pumps with the piping string lowered into the well. Then, the formation pressure was measured using a pressure gauge lowered to the bottom of the stopped well. After that, methanol in an amount of 10 m³ with a capacity of 10 m³ per day was pumped into the drill string-casing space. Such operating conditions provide approximate equality of the bottom-hole pressure to the formation pressure. Then 0.5% solution of hydrochloric acid with addition of 0.2% of polyacrylamide is fed in an amount of 10 m³ with the same capacity while keeping the bottom-hole pressure approximately equal to the formation pressure. After the solvent and hydrophilizing solution have been pumped, the piping space was closed and the well was kept under these conditions for 14 hours. After that, the formation fluid was forced from the formation into the well using the method of depression on the formation by opening the string-casing space. After this treatment the repeated chromatographic analysis of the hydrocarbons of the given deposit was effected. The results of this analysis are shown in Table 2.

TABLE 2

The results of the chromatographic analysis of the gas condensate after the treatment by the claimed method

| Hydrocarbon | Content, wt. % | Hydrocarbon | Content, wt. % |
|---|---|---|---|
| H—$C_{10}$ | 18 | M-$C_{14}$ | 3.7 |
| H—$C_{11}$ | 15.6 | H—$C_{14}$ | 7.4 |
| H—$C_{12}$ | 15.0 | M-$C_{15}$ | 2.6 |
| H—$C_{13}$ | 4.7 | H—$C_{15}$ | 5.6 |
| H—$C_{13}$ | 9.9 | M-$C_{16}$ | — |
| H—$C_{16}$ | 3.9 | H—$C_{20}$ | 0.9 |
| M-$C_{17}$ | 1.2 | H—$C_{21}$ | 0.8 |
| H—$C_{17}$ | 2.7 | H—$C_{22}$ | 0.5 |
| H—$C_{18}$ | 1.7 | H—$C_{23}$ | 0.25 |
| i-$C_{19}$ | 2.9 | H—$C_{25}$ | 0.1 |
| H—$C_{19}$ | 1.2 | | |
| i-$C_{20}$ | 1.2 | | |

The results of the chromatographic analysis have proved efficient removal of the heavy hydrocarbon fractions from the formation zone about the well.

There is also observed an increase in the condensate density from 0.737 to 0.770 g/cm³, while the productive capacity of the well by gas condensate increased from 0.037 to 1 m³/day.

EXAMPLE 2

A well at the Orenburg gas-condensate deposit was treated. This gas condensate is characterized by the presence of bitumen so that a stable gas condensate was used as a solvent. The formation has the same characteristics as in Example 1. The process technology and quantity of the materials: stable gas condensate and hydrophilizing solution, which consisted of 0.4% aqueous solution of lithium chloride with addition of 0.15% of surfactant in the form of sodium alkylbenzene sulphonate known in the USSR under a trade name "Sulfonol". After the treatment, the productive capacity of the well increased approximately by a factor of 2.5.

EXAMPLE 3

A well on a gas condensate deposit of the Caspian Sea was treated. The drilled-in formation was 8 m thick and included aleurolites. No chromatographic analysis of the gas condensate was effected. Therefore, the most suitable solvent (kerosene) was determined using samples of rock taken from the reservoirs passed by the well. The hydrophilizing solution was made of 0.1% aqueous solutions of hydrofluoric acid. Since kerosene is insoluble in aqueous solutions of acids, after feeding the kerosene, an additional solvent (ethylene glycol) is fed into the well. The additional solvent is fed into the well by two portions. The first portion is fed prior to the basic solvent, while the second portion is fed after that and before feeding the hydrophilizing solution. The volume of all reagents was equal to 1 m³ per meter of the thickness of the productive part of the formation in the zone about the well. The reagents were forced into the well by proportioning pumps with a capacity of 1 m³/day per meter of thickness of the productive part of the formation, i.e. during the first 24 hours 8 m³ of ethylene glycol (first portion of the additional solvent) were fed into the 8-m formation. During this time the formation fluid was removed from said zone. During the second 24 hours 8 m³ of basic solvent (kerosene) were fed into the well. The kerosene completely dissolved the heavy fractions adsorbed in the formation of said zone. During the third 24 hours the additional solvent was fed for complete solution of the heavy fractions and displacement of the basic solvent deeply into the formation. During the fourth 24 hours the hydrophilizing solution was fed, also in an amount of 8 m³, then the well head was closed and kept closed for another 24 hours, then the well was put into operation.

EXAMPLE 4

A well similar to that of Example 3 and having similar characteristics of formation fluid was taken as an object of treatment. A distinctive feature of the process technology was that 0.3% of polyacrylamide was added to the 0.1% aqueous solution of hydrofluoric acid to increase the viscosity and to reduce the velocity of propagation of the hydrophilizing solution in the formation. All other steps of the method are identical to those described in Example 3.

EXAMPLE 5

An object of treatment was a well having characteristics of the formation and formation fluid similar to those described in Example 1. The difference in the process technology was that diaxine was used as a solvent, which was fed into the formation in an amount of 10 m³ during 24 hours.

EXAMPLE 6

A well having characteristics of the formation and the formation fluid similar to those described in Example 3 was taken as an object of treatment. The distinctive feature was that diesel oil was used as a solvent. The oil in an amount of 8 m³ was fed into the formation through the well during 24 hours.

EXAMPLE 7

A well having characteristics of the formation and the formation fluid similar to those described in Example 1 was taken as an object of treatment. The distinctive feature was that acetone was used as a solvent. The acetone in an amount of 10 m³ was fed into the formation through the well during 24 hours.

The results of the treatment of the wells in Examples 3-7 are identical to those of Example 1.

We claim:

1. A method of treatment of a drilled-in underground formation saturated with hydrocarbon gas, comprising the steps of:
    measuring a formation pressure;
    feeding a solvent through a well into the formation, displacing the formation fluid from a formation zone about the well and dissolving heavy hydrocarbon fractions deposited in said formation zone;
    feeding a hydrophilizing solution into the formation through said well, reducing the surface tension between the formation surface and water and displacing the previously supplied solvent, the solvent and the hydrophilizing solution being supplied into the formation while maintaining bottom hole pressure approximately equal to the formation pressure.

2. A method according to claim 1, the formation zone about the well is supplied with a solvent selected from the group including alcohols comprising from one to seven atoms of carbon, ketones, dioxanes, kerosene, stable gas condensate, diesel oil.

3. A method according to claim 2, wherein a solvent dissolving in the hydrophilizing solution is selected from said group of solvents.

4. A method according to claim 3, wherein the solvent dissolving in the hydrophilizing solution includes alcohols comprising one to seven atoms of carbon, ketones, dioxanes.

5. A method according to claim 1, wherein the formation zone about the well is supplied with a hydrophilizing solution selected from the group comprising weak water solutions of acids with a concentration less than 1%, weak water solutions of salts of alkali metals with a concentration maximum 1%, as well as solutions of surfactants.

6. A method according to claim 1, wherein the solvent fed into the formation has a velocity of propagation in the formation equal to the velocity of propagation of the hydrophilizing solution supplied to the formation.

7. A method according to claim 6, in which the hydrophilizing solution is provided with an agent increasing the viscosity of said hydrophilizing solution.

8. A method according to claim 7, wherein the agent increasing the hydrophilizing solution viscosity is polyacrylamide.

* * * * *